United States Patent Office 3,642,985
Patented Feb. 15, 1972

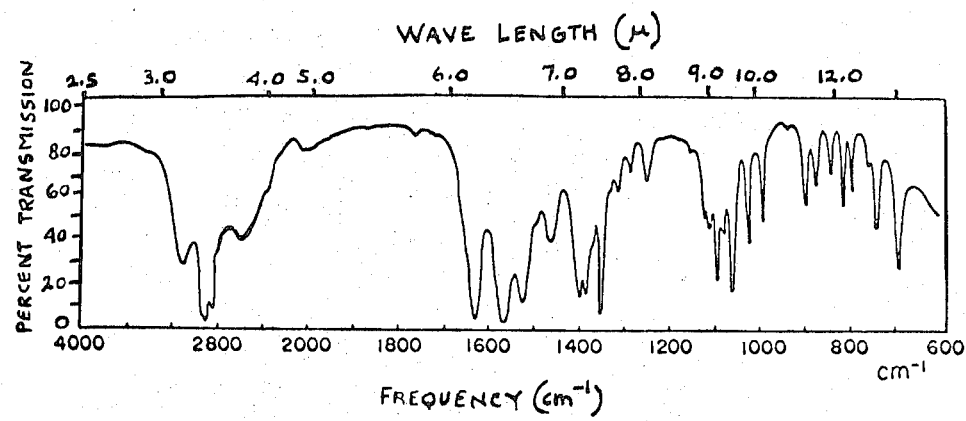

3,642,985
THREOMYCIN AND PRODUCTION THEREOF
Ken Katagiri, Ikeda-shi, Japan, assignor to
Shionogi & Co., Ltd., Osaka, Japan
Continuation-in-part of application Ser. No. 512,549,
Dec. 8, 1965. This application Feb. 27, 1967, Ser.
No. 623,502
Claims priority, application Japan, Dec. 8, 1964,
39/69,291
Int. Cl. A61k 21/00
U.S. Cl. 424—120                             3 Claims

ABSTRACT OF THE DISCLOSURE

An antibiotic, Threomycin, having antibacterial properties, and a process for producing the same being characterized by cultivating *Streptomyces threomyceticus* n. sp. in an aqueous nutrient-containing solution under a submerged aerobic condition.

Laboratory. A culture of the living organism has been deposited and is available at the American Type Culture Collection, Rockville, Md., U.S.A., under the code number ATCC 15795.

The complete taxonomy of the new isolate follows.

Taxonomy of Strain L-803

The morphology of the culture was studied on Bennett's agar, incubation at 28° C. for 2 weeks. Abundant, slight yellow growth is covered with powdery, brownish grey aerial mycelium, and yellow soluble pigment diffuses into the medium. Sporophores arise from aerial mycelium in the form of monopodial branching. The spore-bearing hyphae indicate a spiral shape, the spore is recognized to be oval (1.0 x 1.2μ) and its surface is warty or spiny in electron microscopic survey.

TABLE 1

Cultural characteristics on various media after 2 weeks' incubation at 28° C.

| Medium | Growth | Aerial mycelium | Sporulation | Soluble pigment | Physiologic nature |
|---|---|---|---|---|---|
| Synthetic agar (Czapek). | Abundant, light yellow growth. | Light brownish grey. | Powdery, abundant. | Yellow. | |
| Glucose asparagine agar. | ....do. | Abundant, grey. | ....do. | ....do. | |
| Ca-malate glycerol agar. | Light yellow scant growth. | Light grey, poor. | Poor. | Light yellow. | |
| Nutrient agar. | Wrinkling, good growth, slight brown. | Poor, slightly grey. | ....do. | ....do. | |
| Bennett's agar. | Light yellow abundant growth. | Abundant, brownish grey. | Powdery, abundant. | Yellow. | |
| Potato agar. | Wrinkling, slightly yellowish growth. | Moderate, brownish grey with slightly pinkish grey tinge. | Powdery, moderate. | Slightly yellow. | |
| Czapek's solution. | Ring formation, growth is slight yellow, white to grey aerial mycelium. | | Moderate, powdery. | ....do. | |
| Gelatin stab*. | Abundant, ring formation slightly yellow. | Brownish grey. | Powdery, moderate. | ....do. | Liquefaction positive. |
| Starch agar. | Abundant growth, slight yellow. | Abundant, brownish grey. | ....do. | ....do. | Starch hydrolysis positive. |
| Skimmed milk. | Moderate, yellowish growth. | Moderate, grey. | Poor. | | Coagulation and peptonization of milk was weak and pH turned to alkaline. |

*Gelatin stab, incubation 23° C., 30 days.

The present application is a continuation-in-part of copending application, Ser. No. 512,549, filed Dec. 8, 1965, and now abandoned.

This invention is concerned with a novel compound possessing antibacterial in vitro properties and with a process for its production.

In particular, the invention relates to a new composition of matter referred to herein as the antimicrobiological agent Threomycin, to a process for its production by fermentation and to a method for its recovery, concentration and purification.

The principal object of the invention is to provide a new and useful composition of matter which is active against a number of different bacteria in vitro.

Another object is to provide a process for the preparation and recovery of Threomycin.

It has been found that by cultivating under controlled conditions and on suitable culture media a heretofore undescribed bacterium named Streptomyces L-803, a novel composition of matter herein identified as antil microbiological agent Threomycin is obtained. The bacterium employed was isolated from a soil sample collected near Nishinomiya, Hyogo prefecture in Japan and was designated as culture number L-803 of Shionogi Research The following table of carbohydrate utilization shows results obtained in the basal medium of Pridham et al. (J. Bact. 56, 107–114, 1948). Incubation condition was at 28° C., for 2 weeks.

| Source | Utilization |
|---|---|
| l-xylose | + |
| l-arabinose | + |
| rhamnose | + |
| fructose | + |
| d-galactose | + |
| sucrose | + |
| maltose | + |
| lactose | + |
| raffinose | + |
| d-mannitol | + |
| sorbitol | + |
| dulcitol | − |
| inositol | + |
| salicin | + |
| Na-acetate | + |
| Na-citrate | + |
| Na-succinate | − |

+: utilization.
−: no utilization.

3
Physiological properties of L-803

(1) Optimum temperature is 28° C. on Bennett's agar.
(2) Reduction of nitrate to nitrite is recognized on synthetic solution with 3% sucrose added as a carbon source, incubating at 28° C. for 10 days.
(3) Liquefaction of gelatin is completed at 23° C. for 30 days.
(4) Hydrolysis of starch is positive.
(5) Cellulose is not decomposed.
(6) Melanoid pigment is not produced on tyrosine agar plate.
(7) Chromogenic nature is not revealed on organic media.

These findings appear to indicate that the culture, St. L-803, resembles *Streptomyces flaveolus* described in Bergey's Manual of Determinative Bacteriology (7th edition).

However, the culture differs from *St. flaveolus* with regard to:

(1) Spiral formation of spore bearing hyphae.
(2) Color of spore in brownish on various media.
(3) Utilization of cellulose is quite negative.
(4) The culture is able to produce Threomycin.

Therefore, the culture is a new species, and has been denominated as *Streptomyces threomyceticus* n. sp.

It is to be understood that for the production of Threomycin, the present invention is not limited to the particular isolate here described, as variations may occur in the cultural characteristics of this strain without affecting production of the antibiotic. The term "strain No. 15795 organism" therefore also encompasses mutants obtained by mutating agents such as X-ray irradiation, ultraviolet radiation, nitrogen mustards and so forth.

Threomycin, which is produced by the above mentioned microorganism, shows considerable activity against a number of different Gram-negative bacteria. And with other microorganisms, such as $T_2$, $T_3$ phage, its activity has been proven in antibiotic sensitivity test also. The potency of Threomycin may be measured in several different ways. For instance, the zone of inhibition formed upon adding a given sample to an agar plate seeded with a standard culture is one measure of its activity. The following table shows the antibiotic spectrum against a number of different microorganisms.

The figures in the table indicate the minimum inhibitory concentration and inhibition ratio.

TABLE 2
Antibacterial spectrum of threomycin

| Test organisms: | Minimum inhibitory concentration ($\gamma$/1 ml. of synthetic medium) |
|---|---|
| *Shigella dysenteriae* Komagome BI | 5 |
| *Shigella dysenteriae* Kawase | 1 |
| *Shigella dysenteriae* Ohara | 2 |
| *Salmonella paratyphi* A | 5 |
| *Salmonella paratyphi* B | >50 |
| *Salmonella paratyphi* C | 50 |
| *Salmonella typhi murium* | 50 |
| *Escherichia coli* Umezawa | 50 |
| *Proteus vulgaris* | >50 |
| *Klebsiella pneumoniae* | 50 |
| *Bacillus subtilis* PCI 219 | 1 |
| *Mycobacterium tuberculosis* H37Rv | 20 |

TABLE 3
Antibiotics sensitivity of phages T-2 and T-3

| Phage | Threomycin, $\gamma$/ml. | Inhibition ratio, percent |
|---|---|---|
| T-2 | 1 | 95.0 |
| T-3 | 1 | 59.6 |

The inhibitory action of threomycin on the host of the phage, *Escherichia coli* (B) Hardy, was not recognized.

Threomycin has been compared to other antibiotics and found to be a distinctly different compound. For instance, the new antibiotic, when tested by paper chromatography with various known materials using several solvent systems, formed distinct, compact zones on sheets of filter paper.

This invention embraces a process for producing Threomycin by cultivating the new strain No. ATCC 15795 of *Streptomyces threomyceticus* in an aqueous, nutrient-containing solution under aerobic conditions until substantial antibiotic activity has been imparted to the solution. Such cultivation is conducted preferably at a temperature of from 25 to about 30° C. and under submerged conditions of agitation and aeration, for a period generally of from about 3 to 4 days.

Nutrient materials that can be used include an organic nitrogen source, such as ammonium sulfate, ammonium nitrate, urea, soybean meal, peptone, meat extract, corn steep liquor, yeast extract and other proteins, etc., mineral salts such as sodium chloride, potassium chloride, calcium carbonate, potassium phosphate, ferrous sulfate and magnesium sulfate; and a carbon source, such as glucose, starch, glycerol, soybean oil, fructose and dextrin.

But particularly beneficial as nutrients are carbohydrate sources, such as starch and glycerol; nitrogen sources, such as soybean meal, corn steep liquor; and mineral salts, such as sodium chloride and calcium carbonate.

Inoculation of this fermentation may be obtained by employing a growth from slant of Roux bottles inoculated with the new strain of *Streptomyces threomyceticus*. Solid media for the initial growth are commonly nutrient agar, and this growth is used to inoculate either flasks or submerged inoculum tanks. Alternatively, the inoculum tanks are seeded from the flasks. The time required for optimum elaboration of Threomycin is generally at least about two days but not more than five days.

When the organism has produced a satisfactory amount of antibiotic substance as indicated by zone of inhibition in agar plate against *Escherichia coli* B-Hardy in Simon's medium, the culture is filtered and the useful agent recovered. By way of example, difference in solubility, partition concentration in the culture medium reaches 25–30 milligrams per liter by assays utilizing a standard culture of *E. coli* B-Hardy in Simon's medium consisting of 3 grams of glucose, 3 grams of sodium chloride, 2.5 grams of ammonium phosphate, 1.5 grams of potassium phosphate and 0.04 gram of magnesium sulfate per liter of water.

For the extraction, various purification steps may be combined in order to obtain highly purified Threomycin. By way of example, difference in solubility, partition coefficient, adsorption affinity, dissociation degree, salt-forming ability and molecular weight between Threomycin and impurity can be employed. The recovery of Threomycin with the aid of these methods is hereinafter described by way of example.

Since the basic property of Threomycin is clearly disclosed hereinafter, it will be readily appreciated that the name Threomycin is intended to designate not only Threomycin per se but also salts and derivatives thereof.

In extracting Threomycin from the aforesaid filtrate, it is possible to separate impurities from the filtrate by utilization of difference in partition coefficient between the aqueous layer and the solvent layer which is not miscible with water, for example, an organic solvent such as acetate ester. Threomycin which remains in the aqueous layer can be concentrated and recovered after the removal of water by distillation under reduced pressure.

The effective material can also be extracted from the filtrate as a precipitate by addition of a solvent, such as acetone, in which Threomycin is hardly soluble. It is also possible to remove the impurities with a solvent, such as acetone, which does not dissolve Threomycin, and to dry the effective material.

Further, the effective material can be purified by the adsorption onto either cation or anion exchange resins, taking advantage of the amphoteric nature of Threomycin. And the impurities can be removed by adsorption with cation exchange resin, if desired.

The solubility difference of the effective material in its salt form can be utilized, that is, Threomycin has a high salt-forming ability with organic and inorganic acid and these salts can be precipitated from a suitable solvent.

As described above, the dissociation degree and the salt-forming ability of Threomycin can be utilized for the extraction of the effective material. On the other hand, as Threomycin is not adsorbed by active charcoal, active clay and diatomaceous earth, these impurities can also be used for the removal of impurities.

Threomycin has now been isolated in its crystalline form by utilization of the above mentioned methods or combined utilization thereof, and it will be appreciated from the following description that it is a novel material which is completely different from the known conventional antibiotics in view of the chemical and physical properties thereof.

It is an amphoteric compound of colorless plate-like crystalline form having elementary analytical data as follows:

|  | Percent |
|---|---|
| Carbon | 52.94 |
| Hydrogen | 7.17 |
| Nitrogen | 8.91 |
| Oxygen | 30.57 |

The compound has a molecular weight of about 157 and has an experimental formula of $C_7H_{11}O_3N$ based on the above mentioned result of the elementary analysis. The crystalline antibiotic has an apparent melting point of 222–225° C. (decomp.). The optical rotation of the crystalline Threomycin, when dissolved in water, is $[\alpha]_D^{27}=136.1\pm2°$ (c.=1). All preparations thereof show similar ultraviolet curves with maxima at $$196 \text{ m}\mu \text{ } (E_{1\text{ cm.}}^{1\%}=376)$$

The infra-red absorption spectrum of the compound was determined on the mineral oil Nujol; cf. accompanying figure of drawing. Among the characteristic frequencies are the following: 3120, 2565, 2000, 1635, 1570, 1525, 1405 cm.$^{-1}$.

Various crude preparations of the antibiotic give negative Biuret, Sakaguchi and Tollens reactions, however, they have characteristic reactions in Ninhydrin and Xanthoprotein tests. The crystalline compound is soluble in water, very slightly soluble or insoluble in alkanol, acetone and ether.

As described above, the disclosed properties of Threomycin are clearly different from those of other antibiotics.

The median lethal dose ($LD_{50}$) of Threomycin was determined by an intravenous administration in mice to be about 710 mg./kg.

Threomycin, according to the present invention, is useful as a preservative and disinfectant in vitro, because of its inhibiting action against infection-producing Gram-negative microorganisms. Sparse sprinkling of raw fish therewith will for example delay deterioration of the fish due to spoilage-producing microorganisms. It is also useful for sterilizing equipment, for example, surgical instruments, and for the purposes of classifying organisms. Furthermore, it is also useful in obtaining pure cultures of single organisms where a susceptible organism may be separated from a resistant one.

Following example is given as illustration of the presently preferred manner in which Threomycin can be formed, recovered, concentrated, purified and obtained in practically useful form. The example given is merely illustrative and is not to be construed as limiting this invention.

EXAMPLE

A fermentation medium containing the following proportions of ingredients is prepared:

|  | Percent |
|---|---|
| Starch | 2.0 |
| Glycerol | 1.0 |
| Soybean meal | 0.5 |
| Corn steep liquor | 0.5 |
| Sodium chloride | 0.5 |
| Calcium carbonate | 0.35 |

This material was made up with distilled water to provide 4.85 grams per 100 ml., and the mixture is adjusted to pH 7.0 with alkali hydroxide solution. After sterilizing, a flask is inoculated with a suspension of the new strain ATCC No. 15795 of Streptomyces L–803, obtained from the surface of agar slants. The flask is stirred for four days at 27° C. At the end of this period the broth is found to contain Threomycin in the amount of about 25–30 milligrams per liter. After the mycelium is separated from the broth by filtration, the filtrate is shaken with ethyl acetate in order to remove impurities and to collect the Threomycin into the water layer. Activated carbon is added to the broth, the mixture is stirred for half an hour, and the carbon is removed, whereby impurities and colored materials are removed. The partially purified solution of Threomycin is adsorbed on a column of Amberlite IR–120, hydrogen type. The column is washed with a small volume of water and then the antibiotic is eluted by means of 0.5 N ammonium hydroxide. The resultant product is dried under reduced pressure at 70° C. The dry product is extracted with water. The water extracts are filtered and 200 milliliters of acetone are added to the filtrate, 500 milligrams of crude Threomycin being obtained (in a yield of 63%). Thus obtained crude powder is subjected to chromatography on silica gel with a solvent of n-propanol: water (70:30) and purified to a final product of 200 milligrams in crystalline form.

Having thus disclosed the invention what is claimed is:

1. A process for the production of a composition of matter having antibacterial property which comprises cultivating *Streptomyces threomyceticus* ATCC 15795 in an aqueous, nutrient-containing solution under submerged aerobic condition until substantial antibiotic activity is imparted to said solution.

2. A process according to claim 1 which includes the steps of clarifying the culture medium, adsorbing the active component therefrom with a solid adsorbent, and eluting the adsorbate.

3. An amphoteric compound of colorless platelike crystalline form having an elementary analytical data as follows:

|  | Percent |
|---|---|
| Carbon | 52.94 |
| Hydrogen | 7.17 |
| Nitrogen | 8.91 |
| Oxygen | 30.57 | having a molecular weight of about 157; the formula $C_7H_{11}O_3N$ based on the foregoing elementary analysis; an apparent melting point of 222–225° C. (decomp.); and optical rotation, when dissolved in water is $[\alpha]_D^{27} = 136.1 \pm 2°$ (c.=1); showing an ultra-violet curve with maximum at 196 m$\mu$ (E$_{1\,cm.}^{1\%}$=376)

an infra-red absorption spectrum on Nujol with characteristic frequencies 3120, 2565, 2000, 1635, 1570, 1525, 1405 cm.$^{-1}$, giving negative Biuret, Sakaguchi and Tollens reactions; giving characteristic reactions in Ninhydrin and Xanthoprotein tests; and being soluble in water, very slightly soluble or insoluble in alkanol, acetone and ether.

References Cited

UNITED STATES PATENTS 3,309,273   3/1967   Bergy et al. _____ 424—120

JEROME D. GOLDBERG, Primary Examiner

U.S. Cl. X.R.

195—80